Patented Apr. 7, 1942

2,278,472

UNITED STATES PATENT OFFICE 2,278,472

DEHYDRATED PREFROZEN FOOD PRODUCT

Albert Musher, New York, N. Y., assignor to Musher Corporation, New York, N. Y., a corporation of New Jersey No Drawing. Application June 27, 1940,
Serial No. 342,661

3 Claims. (Cl. 99—199)

The present invention relates to foodstuffs and it particularly relates to the preparation of foodstuffs so that they may be more readily shipped, stored, and merchandised and more particularly so that they may be prepared or cooked by the consumer in substantially less time than heretofore possible for the ordinarily dried foodstuff.

Foods, such as vegetables, fruits, meats, fish and other food products, particularly when they have a relatively high moisture content cannot be readily stored over considerable periods of time without possibility of spoilage. It has therefore been necessary to utilize expensive equipment to refrigerate these foodstuffs or to ship and store them under special conditions.

It has therefore become advisable to dry many types of foodstuffs so as to permit better and more economical storage conditions. When these foodstuffs are dried, there is frequently formed, or there is developed during storage, the formation of a hard surface, or a hard formation throughout, or other forms of hardness due to the drying out of the products. This results in the formation of a food product which is quite hard to cook or prepare, in view of the fact that a long cooking procedure is necessary or a long soaking procedure is necessary prior to cooking, or other methods are required in order to produce a finished cooked product, and also in order to produce a product which has the fullest possible digestible qualities.

Because of these long cooking procedures that are necessary, there are usually lost many of the flavors, essences, vitamins and other valuable qualities and characteristics of these food materials.

It is therefore among the objects of the present invention to provide improved foodstuffs, and methods and processes for preparing them, so that they may be readily shipped, stored and merchandised with substantially reduced danger of spoilage by having them in a dry form, but also, at the same time to have them in a condition whereby they will have a very materially improved quick-cooking quality or quick-preparing quality not found in the usual dried or dehydrated food material.

A further object of this invention is to eliminate the necessity for special refrigeration methods which are necessary to preserve various food products, particularly those of a relatively high moisture content. and at the same time to provide these dried foodstuffs in improved form so that they do not require the prolonged boiling or soaking procedure of normally dried or dehydrated foods.

Other and further objects and advantages will also appear from the more detailed description given below, it being understood, however, that this more detailed description is given by way of illustration and explanation only, and not by way of limitation, since many changes therein may be made by those skilled in the art without departing from the scope and spirit of the present invention.

It has now been found that the above objects may be accomplished by subjecting the foodstuffs to a freezing operation which will have the effect of rupturing the cells, or softening the fiber and cell structure of the materials, followed by dehydrating these materials to a sufficiently low moisture content to preserve them, and then, if desired, expanding or exploding these food materials. This process, with precooking where required, will produce relatively quicker cookable food products, in dehydrated condition.

Among the food materials that may be treated in accord with this invention are, for instance fruits, vegetables, meats and fish, and also other materials such as beans, peas, cereals and seeds, etc.

In the carrying out of this invention, many fruits, vegetables, meats, fish, and other foods, may contain sufficient moisture to enable them to be subjected to the freezing process according to the present invention, although in some cases if it is desired to remove some excess water, this may be done by various methods such as subjecting the food material to a hot air blast or to any other drying or water-removing treatment. However, many kinds of food products such as cereals, seeds, various types of dried beans and peas, etc., may contain insufficient moisture and in such cases moisture may be added as by soaking, steaming, boiling, precooking or by other procedures.

Even in the case of products which have previously been dried or dehydrated, such as dried vegetables, fruits, meat, fish, peas, beans, etc., these products may be re-hydrated as by steaming, or precooking in hot water, or by other methods, so as to increase the moisture content to such a degree that they may be subjected to the freezing procedure of the present invention.

Although the amount of moisture, and the temperatures that are required in order to produce the best results may vary depending upon the degree of softening or rupturing of the cell structure that is required, or upon the nature of the food material being treated, or upon other conditions, it has been found with many food materials that very good results are obtained usually when the moisture content varies for example, between 30% and 95%, but particularly when the moisture content is over 30% to 40%. Likewise it has been found desirable with many foods, in order to obtain the best results, to permit the freezing to take place slowly at temperatures ranging between 0° F. and 32° F., although in many cases preferred temperatures run down to minus 20° F. and minus 40° F. and lower. The specific temperatures to be used in order to effect the required results will depend upon the nature of the particular food material being treated, the length of time to freezing exposure and other conditions. The temperatures and other conditions for the food being treated will be readily ascertained by anyone skilled in the art upon making specific tests in the light of the teachings herein.

In general it should be said that it is desirable to carry out the freezing treatment in such a way that there will not be the formation of small fine ice crystals with the consequent lack of rupture of the cells and structure, but rather that there should be the formation of relatively large ice crystals sufficient to puncture, break, rupture or disrupt the cell structure, or the fiber structure, or the food structure, substantially throughout the body of the particular material being treated.

The freezing usually takes place at ordinary atmospheric pressure but it may take place under conditions of pressure or vacuum.

The water content in the foods should be present in sufficient amount so that it is carried substantially throughout the food, and preferably, it should be as uniformly distributed as possible, so that when the freezing operation takes place, the entire structure of the food piece will be affected.

It is preferred to have the water present not only in its relatively free form in the fibers and structure of the food, but also within the cells, or in bound water form. It is usually quite a preferred embodiment of this invention to treat the food materials by cooking, steaming or similar other operations prior to the freezing operation so as to soften, break, or burst all or a good part of the cellular and/or fiber structure of the food piece. In this manner, as much of the bound water as possible is released, so that the cell walls are broken wherever possible, and also so that additional softening of these fibers can take place previous to the freezing operation.

In connection with the freezing procedures, as well as with the cooking and steaming procedures that are involved, the position of the water in the various foodstuffs is quite important, and as pertains to this invention this position of the water is utilized to advantage.

The bound water which is contained within the cell structure may be utilized for the purpose of breaking the cell walls so as to soften this structure and so as to facilitate entrance into the cells, of the cooking water, whereas the relatively free water between the cells and fibers may be utilized for the purpose of disrupting and separating the fibers and body structure so as to enable the easy entrance of the cooking water between the fibers, and thereby so as to enable quick cooking characteristics. This is accomplished by the relatively slow freezing operation which results in the formation of large ice crystals within the food so as to rupture the cells and structure of the foodstuff.

In many cases, generally, it is desirable to cut the food into smaller pieces and process them in this condition in accord with this invention. Particularly in this desirable where it is desired to have a quicker or more complete and more thorough penetration of the cooking, freezing, exploding, or other procedures. Of course, the cutting of peas, beans, and similar small-sized foods is usually not required or desirable.

The exact steps of this freezing procedure and the exact temperatures to be utilized will depend in large part upon the character of the food material being treated, upon the amount of sugar or salt or other soluble materials which is contained within both or either the bound or free water present in the cells and structure, and this freezing treatment will also depend in part upon the amount of water-absorbent or water-bodier materials present therein which may take up either the free or bound water as the case may be.

As a general rule the temperature may be lowered gradually, slowly, or in steps to temperatures below 32° F. or if desired there by be a relatively faster decrease in temperature say to 15° F. or 20° F. and then this temperature, after a period, may be decreased further, if desired.

Sudden changes in temperature from higher, to lower, to higher temperatures, etc., with repetition, as required, are quite effective as thermal shocks to produce or enhance cell and structure disruption.

In any case however the temperature should be carried out in such a way that the ice crystals will not tend to be of a small, fine crystal formation which will not disrupt the structure of the food.

As one procedure, for example, which may be readily applied to materials such as for example raw carrots, apples, etc., the temperature may be suddenly lowered from 32° F. to 25° F. and kept there for a period of an hour. Then the temperature may be gradually lowered to about 15° F. and maintained there for a period of two hours, or longer if required, and then a further treatment at 0° F., for example may be given, if desired. Depending upon the nature or the strength of the cell wall of the particular food that is being utilized, the freezing temperatures and the lengths of time for freezing may be adjusted so as to result in the sufficient softening and breaking or rupturing of the cell structure. This may be determined microscopically, for example, or by the development of softness in the product.

Where, instead of using the full water content food materials, it is desirable to start with dehydrated or dried materials, these dried materials may be re-hydrated to the desired water content by boiling them in water or in other aqueous materials. After this cooking procedure has been carried out, the excess liquid that is not within the food piece may be removed, if desired or required, by partly dehydrating, or by draining, or by air-drying, following which, the freezing operation may be applied to the particular materials.

In the case of low water content materials such as cereals, seeds, and other materials of similar nature, these materials may preferably be hydrated by steaming them or cooking them in boiling water for a desired period of time until the cells or structure softens, or, until the starch grains thereof tend to swell or until they have absorbed as much, or as little water as required, depending upon the nature of the final product desired. At this stage, any excess water may be removed or drained off, if necessary, although just draining off is usually preferable in all cases. Then, the cooked and hydrated, or steamed and hydrated cereals, seeds, dehydrated foods, or other products should be subjected to the freezing procedure.

If desired, depending upon the character and degree of the structure softening or disruption that is required, it is desirable in many cases to let the particular food material, during the freezing operation, come back to 32° F. or higher temperatures, so as to melt all or a good part of the ice crystals, and then, to subject the food material again to a freezing procedure. This may be repeated one or more times, as required.

An important feature of this invention resides in the fact that the material, after the freezing procedure, is then subjected to a procedure that will markedly retard the development of any decay or decomposition of the food. It has been found, for example, that if the food product is now dehydrated, after this freezing operation, to a relatively low moisture content preferably below about 20% to 25% and desirably above about 2% to 5%, that the food product acquires high stability and does not tend to spoil or deteriorate and will have relatively all of the stabilized characteristics of dried food products except that now, these dried food products may be much more readily cooked and prepared without the usual long soaking and long boiling procedures that were hitherto necessary.

Although in this dehydration operation it may be desirable for various purposes to reduce the moisture content to various points, it has usually been found that it is preferred to have at least 2% to 3% of moisture in the final product, or to have above 5% to 7% moisture in the final product so as to enable more ready cookability which is not readily available when the product is entirely dried out. This also has the advantage of retaining at least some of the water soluble flavors, so as to enhance the flavor element.

It is also advisable to seal the product hermetically, or under a vacuum or with various water repellent coatings, etc., so as to retain as much as possible of this moisture within the food material, and also so as to keep the food fibers as soft as possible in order to enable quicker cooking characteristics.

In this drying procedure it is often desirable to carry out the drying in such a way that the food materials will oxidize as little as possible. For this reason the drying may be carried out under vacuum, or in an atmosphere of carbon dioxide or nitrogen, or in other inert atmospheres.

Desirably the drying temperatures may vary for example from 80° F. to 212° F., or more or less, depending upon whether vacuum is used, the degree of dryness that is required or the general characteristics of the food material that is being dried, or depending upon other results or characteristics desired. However, for most purposes the preferred temperatures of dehydration run for example between 120° and 190° F., and the length of time for dehydration necessarily depends upon the amount of dehydration required, the temperature, and other conditions.

One of the usual results of the products produced in accord with this invention is that a relatively greater water-absorbent quality is produced in the food. This enables substantially quicker absorption of water than is possible with normally dried or dehydrated food products, and therefore, improved cookability results.

Instead of drying the food materials in a dry heat, at this point or at other points throughout the procedures as described herein, these food materials may be placed into a liquid oil or into a molten hard fat and dried to the required moisture content. The molten hard fat in which the food materials are boiled or dried may be allowed to congeal, particularly quickly, so as to immediately harden around the food pieces and thereby so as to act as a water repellent in order to keep as much moisture as possible within the food pieces, and also so as to more fully retain the softness of the fiber structure.

This drying with fats or oils usually takes place at temperatures above the boiling point of the water, and preferably at not too high temperatures, so as to avoid loss of flavor, etc. The molten hard fat can then congeal around the food pieces immediately after the required moisture has been evaporated, and thereby will provide a condition whereby a fat protection will take place immediately after the required amount of moisture has been evaporated, so that there will be relatively little or no oxidation or other deterioration effects taking place from the time the product has been dried until it is protected with the fat.

In view of the fact that relatively large ice crystals are formed in the embodiment of this invention, it is generally advisable, in thawing these products, to thaw them relatively slowly, and rather completely, before drying them, or cooking them, or otherwise processing them as herein described. If these frozen food pieces are thawed quickly, there is a tendency for a part of the juice and flavor which they contain to seep out, part of which may be lost whereas if the thawing is allowed to proceed slowly, a fairly good part of this seepage material is allowed to be re-absorbed by the food pieces.

Where there is insufficient water in the cells or fiber structure, or where it is desired to enhance the disruption of the cells or structure, even when the foodstuff contains relatively high percentages of water it is often desirable to force even more water into the cells so as to burst or soften the cells, or so as to enable, during the freezing operation, the formation of ice crystals in the relatively free water that is outside of the cell structure. This further absorption or enhancement by additional water is accomplished by steaming, cooking, and other similar procedures, under pressure, vacuum, or room temperature, or by various similar methods. Permitting the product to cook or steam in its own juice or in high concentrations of its own juice offers new advantages in flavor and other characteristics.

Various repeated cookings may be used to enhance this procedure or combinations of various cookings intermingled with various freezings, in varied sequence, if desired, and other combinations may be used in order to produce the desired amount of softening, or fiber or cell disruption.

Also, where desired, starch-containing materials may be washed, before or after cooking, one or more times, or at suitable points, so as to wash out all, of whatever amount of starch it is wished to eliminate. In many cases, the washing out of the starch, particularly where it is present in high amount, is quite desirable, so that in the drying or dehydrating operation there is less tendency for the starch that is present to harden or cake. Also, if substantially all of the starch has been washed out and the product is then expanded or exploded, as described hereinafter, the resultant product will not have the usual characteristics of an exploded starch product.

The food products resulting from this process of freezing and drying, or from the process of cooking, freezing and drying, and various other combinations of these processes as described herein, may be directly sold and merchandised as edible food products to be used either alone or in conjunction with the manufacture of prepared food materials as for instance soups, sauces, gravies and in the making of many other foods. These food products prepared in accord with this invention may be much more readily cooked and have other similar valuable characteristics and improvements as compared with the ordinarily dehydrated food materials.

*Example I*

Raw carrots are washed well and cut into small pieces about one-quarter inch to three-eighths inch square. These carrot pieces are cooked in a steam cooker at 15 pounds pressure for 25 minutes. They are then carefully removed from the steam cooker and placed on trays.

These trays are placed into a chill room having a temperature of 25° F., and they remain in the chill room for a period of 2 hours. They are then placed into a chill room with a temperature of 15° F. for 4 hours. Following this they are placed into a chill room with a temperature of 5° F. for 5 hours and following this they are placed into a chill room with a temperature of —5° F. for 5 hours.

Following this procedure the carrots are removed and are thawed out gradually over a period of 4 hours.

The carrots are then placed into a dehydrator that is maintained at a temperature of 145° F. and they are allowed to dry to the dryness of commercially dried carrots. In this particular experiment, the carrots were dried for a period of 6 hours, with a turning of the carrots taking place at the end of 4 hours, after which the carrots had a moisture content of about 9%.

These carrots produced in accord with this invention are much more readily and more quickly cooked than the usual dehydrated carrots. Also, they retain their flavor better than the usual dehydrated carrots.

*Example II*

Commercially canned cans of peas are cooked in a pressure cooker at 15 pounds pressure and at 250° F. temperature for 1½ hours. Following this the cans are carefully opened and the excess liquid is drained off.

These peas are then placed into a chill room having a temperature of 20° F. and allowed to remain in this room for 4 hours. They are then placed in a chill room having a temperature of 10° F. for 5 hours. Following this they are placed in a chill room having a temperature of 0° F. for 5 hours and following this they are placed in a chill room having a temperature of —10° F. for 5 hours. They are then gradually thawed out over a period of 5 hours.

After this the peas are arranged in trays and are placed into a dehydrator, with the peas being not more than about ¼ inch high with plenty of air spaces between them. The peas should be dried to the usual dryness for commercially evaporated vegetables. In this particular experiment they were dried until the moisture content was reduced to about 9% which was at the end of 12 hours in an incubator which was held at a temperature of 140° F. The peas are turned frequently so as to have a uniform drying.

*Example III*

Hydrogenated cottonseed oil with a melting point of 120° F. is melted at a temperature of 140° F. The treated dried carrots of Example I are immersed into the hydrogenated cottonseed oil while the fat is at 140° F. temperature. The excess fat is then allowed to drain off the carrot pieces and the remaining fat congeals around them. This results in a substantially better keeping quality for the treated carrot pieces in that their fibers are retained in a softer condition with the retention of some of the moisture within the pieces. Thereby quicker cooking quality and improved flavor and keeping quality results. (End of example.)

Where it is desired to enhance the character of these foodstuffs and render them even more susceptible to quick-cookability, and where it is desirable to shorten the cooking time of some food materials which may have been previously frozen and dehydrated, these food materials may be expanded or exploded, and their structure thereby opened up or given an extra disruption by means of subjecting them to an elevated temperature and pressure which is then suddenly and instantaneously released.

For example, after the freezing and dehydration, or other treatments described herein, the food pieces whether they be meats, vegetables, fruits, fish, peas, beans, apples, celery, etc., may be placed into a closed chamber or into a pressure gun and subjected to elevated temperatures as for example, above 200° F. to 250° F. but desirably, for most purposes, the temperature should range between 300° and 500° F.

While in this chamber, steam, or other fluid pressure vapor, etc., may be admitted, or sufficient steam may be created from the water present in the dehydrated material. As a general rule the material should preferably contain less than 35% of moisture and generally between about 7% to about 20% when placed into this closed chamber. Also, for purposes of quick cookability, the resulting exploded or expanded product should contain some moisture, and usually, above 2% to 5%.

The pressure also may be considerably varied, as, for example, from about 30 or 40 pounds per square inch to 200 to 300 pounds per square inch, although the pressure, temperature, length of time involved, and other conditions may be adjusted to whatever amounts and conditions are necessary to produce the desired results, and depending upon the characteristics of the products treated.

The length of treatment in this closed chamber may be above a few seconds and may be long as 18 to 20 minutes, or longer, although usually the length of exposure in the pressure gun, prior to being ejected by the explosion, runs for example from 5 to 45 seconds up to 5 to 8 minutes.

Then, after this treatment has been completed the chamber is opened and the food materials permitted suddenly and instantaneously to be ejected so as to expand, and so as to form passageways, particularly connecting passages, interstices, etc., and for the most part, of greater than capillary size, so that if the product is placed in water it will be most readily cooked, since the water can readily penetrate therein and contact as much fiber and cell structure as possible so as to produce quickly-water permeable, and quick-cookable characteristics.

*Example IV*

The treated dried peas of Example II are placed into a closed chamber or pressure gun, and superheated steam of a temperature of 500° F. is forced into the gun so as to develop an immediate pressure of 50 pounds per square inch within the gun. The peas are then kept in the gun at this temperature and pressure for a period of 20 seconds. The gun is then suddenly opened so as to instantaneously release the peas to atmospheric temperature and pressure.

This explosion procedure results in the structure disruption of the peas so as to produce entirely new qualities of tenderness, quick-disintegratable quality, and quick cookability as well as other new and unexpected improvements in the product.

*Example V*

The dried treated carrot pieces of Example I are placed into a pressure gun and a superheated steam pressure of 50 pounds per square inch is developed within the gun at a temperature of 400° F. The carrot pieces are maintained at this temperature and pressure for a period of 7 seconds, after which the gun is opened so as to instantaneously eject these carrot pieces in an exploded condition. The unusual result in exploding carrot pieces that have previously been given the freezing treatment as herein described, is that now, these carrot pieces can be exploded at a lower temperature and for a shorter period of time than heretofore required where the freezing treatment is not utilized. The advantage of this is that excessive heat is not required in the explosion treatment of the carrots and thereby substantially improved flavor results, without the usual amount of scorching or caramelization of the sugar in the carrots.

*Example VI*

Palm kernel stearin of 110° melting point is melted at a temperature of 140° F. The carrots of Example V and the peas of Example IV are mixed together in equal portions by weight. These combined materials (or the carrots or peas separately if desired) are dipped into the melted palm kernel stearin at the 140° F. temperature and are kept there for about 10 seconds. (To enable better penetration of the fat into the food pieces, the fat may be maintained at a higher temperature of 180° to 190° for example.) The carrots and peas are then removed and the excess fat is allowed to drain off.

When the fat congeals (the carrots and peas may be exposed to quick chilling if desired), the fat will have become impregnated within the interior structure of the carrots and peas so as to seal the openings and interstices that have been formed by the explosion, and also so as to coat the interior structure of the material. Thereby there is retained the desired softness of the fibers together with the retention of flavor and other advantages.

If desired a sufficient amount of fat may be allowed to remain, and the carrots and peas (combined or individually) may be briquetted into individual bricks which may be packed in this form for more convenient handling and utilization. (End of example.)

Although this procedure of explosion disruption or expansion is carried out in one step, it may be also carried out in a plurality of steps in which case the same, or different temperatures and pressures and time periods may be utilized. For example, the food material may be subjected to 1 or 2 or 3 explosion or expansion treatments of the character above described at temperatures varying from 200° F. to 300° F. and at pressures varying from 20 to 30 or 40 pounds per square inch, and for time periods varying from 15 seconds up to several minutes. This multiple expansion or explosion procedure is particularly desirable where the food structure is rather delicate and where excessively high temperatures are liable to cause caramelization of the sugar, or destruction of other materials present in the food product which give it its desirable flavor or quality as the case may be. In these cases, for instance, a multiple expansion procedure at a lower temperature and/or pressure has advantages over a single explosion at a higher temperature and/or pressure, and usually the time, temperature, and pressure of multiple explosion processes is so regulated that each explosion of the multiple process is not sufficient to provide the full cooking quality that is desired, but relatively less intense explosions take place, which, in the aggregate, will result in the cookability required, without the disadvantages of loss of flavor, caramelization of sugar, excessive disruption of structure, etc.

The food products treated with this explosion procedure may be ejected from the pressure chamber, if desired, into oil or molten fat, into fatty or other vapors, or into atmospheres of nitrogen, carbon dioxide, or other inert gases, etc. These embodiments may be used to aid in retention of flavors, retarding or elimination of discoloration, oxidation, etc.

Also where desired, the foods, such as peas, beans, etc., may be powdered or pulverized, after the dehydration, whether or not exploded, and then, if desired they may be dipped into or coated with a plastic or molten fat, etc., to retard discoloration, etc.

Although the usually preferred procedure, generally, for most food products, is the procedure of first cooking or steaming if required, and then freezing, and then dehydrating, and then expanding or exploding, if desired, nevertheless depending upon the conditions available, the results it is desired to accomplish, the characteristics of the foods and other considerations, this sequence may be varied from time to time as required. Also various of these operations may be repeated as required in order to enhance this procedure.

For example also, the food may first be dehydrated and expanded or exploded so as to expand or disrupt the structure, and it may then be rehydrated, cooked or steamed, and frozen, and then dried again, with or without another expansion procedure. Various other sequences may further be utilized.

It is generally found with many food products that the freezing methods herein described, whether or not used with cooking, but when combined with the explosion process, usually produce much more acceptable products in their quickly-cookable condition than when the same foods are treated by an explosion process alone. This is because, with many food products, there is a tendency for the explosion to tear, or shred, or disrupt the structure much more than is desired, with the result that mushiness, and also various burnt, and other off-flavors are produced. In fact, in many cases, when a less intense explosion is given in conjunction with the freezing procedure as described herein, it is not sufficient to produce the full cookability desired, when used alone, without freezing, etc., whereas when this same explosion is used in conjunction with food prepared in accord with this invention, the resultant foods are of a precooked or pretreated nature so as to enable their having relatively more soft and tender qualities, and this less intense explosion that is given, thereby results in opening the structure so as to permit the quick entrance of the cooking water into the structure thereof.

Furthermore, in a process of violent explosion, there is not utilized the slow cooking, or fiber softening procedures such as is found with freezing, with or without cooking. These slow cooking or pre-softening procedures are quite important with many foods in order to produce properly cooked foods.

Aside from the other procedures herein mentioned in conjunction with the freezing operation, the food product may be roasted, either in a relatively dry roast, or in oil, or fat, at various points in the procedure, so as to produce various new characteristics.

For example, the product, after it has been frozen, with or without cooking, or after some drying, may be given a very short dry roast, or it may be given a treatment or boiling in oil or fat. This treatment may take place before or after the explosion. In these various roasting procedures that may take place, however, there is a tendency for the product to become dry or crisp, and this will reduce the quick cooking quality of the food, although it will add various flavor characteristics. Therefore, this roasting procedure is preferably carried out with oil or fat, and not as a dry roast. Also preferably it should be controlled so that some moisture will be left within the product so as to enhance this quick cooking quality. Also care should be taken in the roasting procedure, to crispen or harden the outside or interior portions of the product as little as possible, so as thereby to affect the quick cookable nature of the product as little as possible. To be quickly cookable, the product should remain relatively soft or quickly water-absorbent.

The foods or food pieces which are obtained, whether they have been subjected to only freezing followed by dehydration, or whether or not coupled with cooking, steaming, etc., or whether they have been further coupled with expansion or explosion, as described herein, may be coated, impregnated, or otherwise treated to render them less susceptible to oxidation or deterioration, or to enable them to retain therein, moisture, flavor, and softness of the fibers, and so as to enhance the quality of being more readily cookable to form a final cooked preparation.

For example, the resulting foodstuff, after the procedures above outlined, may be coated with various preservatives, or protectives against deterioration, either dry, or mixed with liquid materials, or they may be coated with fats or oils, at reduced or increased temperatures, or they may be dusted or coated or impregnated with flavoring materials such as sugar, salt, condiments, essential oils, extracts, various types of flavors, etc., either in dry or liquid or dissolved form.

The food products treated in accord with this invention may be divided into two distinct classes, namely, high starch materials such as high starch beans, peas, potatoes, bananas, etc., and also cereals, such as rice, oatmeal, etc., and low starch or no starch materials, such as meats, fish, celery, etc.

With low starch materials it would not be expected that the combined cooking-freezing treatment, for instance, or the contact of the food with the water of the freezing process would produce relatively any caking or lumping in the dried end product, and this proves to be correct.

However, with high starch food materials, it would be expected that after the contact of the starch materials with the water of the freezing process, and particularly with the combined cooking-freezing operation, with the final drying operation, that the starch in these materials would finally harden, gum and cake, so as to make quick cookability practically impossible.

However, quite unusually, it is found that this is not the result that occurs. Apparently, the freezing operation in some way affects the starch so as to eliminate or substantially retard this expected result.

As an example of this, it is known that the usual dehydrated potatoes and dried high starch peas, for instance, are quite difficult to cook, and very much more so than other dehydrated foodstuffs such as low starch carrots. However, after being processed in accord with this invention, high starch peas and low starch carrots can be made to be relatively close in cooking quality to each other.

In the processing of high starch materials in accord with this invention, it is usually desirable to treat them differently from the low starch materials in that these high starch materials generally require dehydration at a lower temperature for better results.

In the preparation of relatively high starch materials such as starchy peas, beans, potatoes, bananas, etc., the use of the freezing treatment, with or without the cooking treatment, and with the subsequent drying and explosion, is much more effective in producing quick cookability of the food products than the use of explosion alone, without the freezing or accessory cooking treatment, etc., as described herein.

Whether in exploded, or unexploded, or in powdered or pulverized form, it is usually desirable to coat, impregnate, or otherwise protect a food of this invention with protective materials and particularly with water repellent materials such as oils and fats, and preferably with fats which are in a plastic or hardened condition at room temperature. However, under various conditions various other materials or combinations thereof may be used for impregnation, coating, etc., as for instance, sugar, preferably when it is of a quickly dissolvable or quick cookable nature.

In many cases it has been found desirable to make either an oil-in-water emulsion or a water-in-oil emulsion, but preferably a water-in-fat emulsion, to be used as the protective coating for various food pieces, particularly where briquetting is to be one of the results. An example of a water-in-fat emulsion consists of an emulsion or emulsion-like product of a sugar syrup mixed with a molten hard fat which is then mixed until the hard fat congeals sufficiently to hold the sugar syrup in emulsified form. This material may be used for coating as well as for binding purposes.

Examples of fats or oils that may be used are the vegetable stearins such as cocoanut oil stearin, cotton oil stearin, palm kernel stearin, etc., hydrogenated cottonseed oils, animal fats, olive oil, corn oil, peanut oil, sesame oil, or other fats or oils, or combinations of these or other fats and oils, etc. Mineral waxes, paraffin, etc., may also be used in certain cases for specific admixtures or applications, although in edible products, the use of these materials are desired only in small amounts.

Fats of a hardened or plastic nature, such as those described above, may also be used where required as binding agents, where it is desired to form the food materials of this invention either by themselves or in conjunction with other food materials, into cakes, briquettes, or other food units.

Preferably, however, when the food materials of this invention, either with or without other food materials, are formed into such food units, for the purpose of resulting in a quick cooking food brick it is preferable to use as the binding agent, binders which will not readily cake or harden, but rather binders which will very quickly disintegrate and melt or dissolve, etc., so as to provide for quick disintegration of the food bricks or units and thereby so as to promote quick cookability. The preferable binders for this purpose are plastic, or preferably hard fats, and sugars, either alone, or in combination with each other. Where sugars are used, they should be of a non-crystallizable nature, or when crystallized, they should be in the form of small crystals with passages and pores throughout, so as to enable quick dissolution, or the sugar may be combined with other materials such as glycerine, etc., in order to produce water retaining, or non-crystallizable quality.

For the purpose of briquetting the various food materials of this invention, the various binder materials that are used may be used separately or may be combined in order to produce the best results. For example, an emulsion of the molten hard fat and the sugar syrup may be made where required. Also, if desired, and particularly where hygroscopic materials are present, the molten hard fat may be used as the protective coating for the hygroscopic materials and is congealed thereon, and then the sugar syrup or other sugar materials may be used as the binding agent, so that the aqueous nature of the sugar syrup does not affect the water absorbent qualities of the hygroscopic material. Still further, where desired, the molded food unit, which is bound by a sugar syrup, and in which the pieces have been coated with a fat- or wax-like water repellent material, may be placed into a temperature above the melting point of the water repellent material so as to form laminations, etc., and thereby so as to form a more durable food unit, when congealed.

The advantage of having food pieces which have pores, or passageways, is that, particularly as far as briquetting is concerned these pores or passageways act as a good medium for anchoring the binding agent within each piece, and thereby form a much more substantial food brick.

When molten hard fat is used for instance either as a binding agent or as a protective, it is sometimes desirable to add this molten hard fat at higher temperatures as for instance 200° F. to 220° F., or higher so as to get a more complete fat coverage, and also in some cases it is desirable immediately after adding the molten hard fat to give the product a quick chill so as to congeal the hard fat as quickly as possible and thereby get as thorough a coating as possible of the hard fat upon the surfaces, and within the interstices and pores of the food pieces. Also in some cases it is desirable to keep the food material for a length of time in the molten fat at the higher temperatures.

In some cases also it may be desirable to use fat of various melting points at different stages in the operations of impregnation or briquetting or coating, as for instance a molten hard fat with a melting point of 100° F. may be used for the purpose of impregnating the food pieces and forming them into a briquette and a molten hard fat of a melting point of for example 120° F. may be used to coat the finished briquette. The result of this will be to give more resistance against atmospheric temperatures on the outside of the briquette, but to result in a quicker disintegration of the food brick when placed into hot water for cooking.

As noted herein, where it is desired to include hygroscopic materials, such as powdered milk, etc., in a food brick, particularly in conjunction with food pieces which are then treated with aqueous binders or materials such as glucose syrup, etc., it is desirable to coat the milk powder or other hygroscopic materials with a molten hard fat, wax, or other similar water repellent material so as to avoid contamination of the hygroscopic materials with the aqueous nature of the binder or other materials that are used.

In the making of food briquettes, it is often desired to enhance the cooking qualities of the food brick by aerating the food by whipping air or inert gases into the fatty material or into the other materials that are used for binding agents, or by otherwise introducing air into the brick.

Also mixtures of dry effervescent materials such as sodium bicarbonate and tartaric acid may be mixed into the food bricks so that when the brick is cooked the effervescent agents will combine and will form a gas in the brick which will result in the brick rising to the surface of the water so as to enable quicker and more effective cooking procedure.

Also it is of advantage to include effervescent materials within the brick so as to provide for more ready disintegration of the brick upon cooking, in view of the fact that the effervescent materials, upon coming in contact with water, will have a marked tendency to push the various food particles apart so as to permit quick disintegration, and thereby so as to retard the development of any lumpiness or caking.

Aside from the cooking and steaming procedures that are used as disclosed herein so as to enhance the structure, fiber or cell disruption of the food materials, other methods of enhancement may be used in conjunction with this freezing operation as for instance, boiling or soaking the food in oil or fat, preliminary to, or as an accessory to, the cooking or freezing operation, so as to further soften the fibers. Or, the food pieces may be subjected to high voltages and currents so as to cause additional cell disruption. These electrical discharges may take place at various points during the procedure, as for instance after the product has been given a steaming or cooking, or while the product is being cooked, and at various other points throughout the procedure. The use of electrical disruption as disclosed herein also may take place while the product is being cooked at room temperature, or under vacuum but preferably while it is under pressure.

In the embodiment of this invention, the processes that are used should preferably be regulated, where possible, so that the end product, upon being cooked by the consumer in the usual cooking or boiling routine, will retain substantially its unity and will not disintegrate into a mushy or mealy mass.

Although explosion, as described herein, is utilized mainly in conjunction with the foods after the excessive amount of moisture has been reduced from them and preferably when they are of a moisture content below 35%, nevertheless, for the purpose of enhancing the freezing or the cooking operation of this invention, this explosion may take place while the food retains its full, or a high moisture content and before, after, or in conjunction with the steaming, cooking, freezing, or other operations, or this explosion may be given to the food while it is in its raw state prior to any cooking, steaming or freezing, etc.

This procedure relating to explosion while the food contains larger quantities of water, is particularly adaptable to materials of very fibrous content such as, for instance, meats, and it is also more particularly applicable to larger food pieces such as larger pieces of meat rather than small meat pieces. The reason for this is that unless the food is of a larger piece, or unless it is of a more fibrous nature, the explosion will have a tendency to produce a more or less disunified, soupy, or shredded mass which in most cases would produce a less desirable end product. Of course, temperature, pressure, time, etc. are explosion factors that should be adjusted in this operation to aid in providing the results desired.

The explosion procedure, however, for the general embodiment of this invention, is used primarily in conjunction with the dehydrated food as described herein, for the purpose of disrupting and opening up its interior structure and/or cell structure as much as possible so as to result in a more water-permeable and water-penetratable product with enhanced quick-cooking characteristics.

Still further, at various points throughout the various procedures, enzymes, ferments, or digestives may be utilized for the purpose of aiding in softening or preparing the food so as to enable quicker cookability. This application is particularly important in conjunction with meats and animal protein materials, where such further softening or digestive action produces further enhancement of the qualities desired.

It is generally of advantage to explode or expand the meat or food product before treating it with enzymes or digestives, as for instance by placing it into an aqueous medium containing the enzyme. After the expansion process, the digestive medium is better enabled to get within the structure of the food piece and thereby to more readily and more completely affect the food. The enzyme action may be stopped at whatever point is required, as for example, by heat, or other known methods. Also this digestive modification may take place before or after the cooking or freezing process, or at various other points in the procedures of this invention, and the product may then be dehydrated, or further treated, as required.

Where it is desired to sterilize, or where it is desired to retard or prevent the growth of mold, etc., the food products of this invention after they have been completed, may be subjected to a sterilization procedure in molten fat whereby they may be retained in the molten fat or in a similar product at a sterilizing temperature for the required period of time. Preferably this should take place in a closed chamber under pressure so that there will be a minimum amount of moisture lost from the food product, particularly if the finished product contains moisture that it is desired to have the product retain in its finished condition, after sterilization.

A further utilization of this invention is in conjunction with extraction and expression procedures. For example various products such as carrots, beets, meat, etc., may be more readily and more completely expressed so as to produce carotene, beet juice, beef juice, etc., by the utilization of this invention. By the process of freezing various food products, with or without the cooking treatment, or in further accord with the disclosures herein, the cells containing the bound water, and also the structure containing water of a bound or free nature, releases this water or juice, and thereby provides much easier and more complete extraction or expression.

Of course, for this extraction procedure where the food product has been given its final dehydration, then water or other aqueous mediums, or oil mediums must be added to the food product in order to re-dissolve the food flavors that are contained therein, so as thereby to enable the expression of these food elements therefrom in liquid form. In this way the flavors, essences, and other elements, may be more easily and more completely extracted from these food materials for cooking purposes or for purposes other than for the cooking procedure.

So as to summarize some of the possible procedures for the carrying out of this invention, the following exemplary steps are given:

*Step #1.*—Dry food pieces, or food pieces containing under 10% to 15% water content are soaked, steamed or boiled so as to increase the water content therein to over about 35% to 40%, so as to provide sufficient water therein to enable the formation of relatively large ice crystals within the structure of the food when freezing takes place. The procedure may now continue with Step #3 below.

*Step #2.*—With reference to food pieces containing, for example, over 35% to 50% water content as, for example, carrots, garden peas, fish, meats, etc., an optional procedure at this point may be to first precook these food pieces by boiling or steaming, preferably by steaming in their own juices, so as to soften the food pieces. This step is optional although it produces increased softening of the food structure. The procedure should now continue with Step #3 below.

*Step #3.*—Slowly freeze the food pieces at temperatures ranging between —20° F. and 32° F., for example, gradually reducing the temperature over a period of ten to twenty hours, for example, within this temperature range.

*Step #4.*—Dehydrate the food pieces to below

20% to 25% of water, and usually to below 10% to 15%. A specific preferred moisture content in the case of some foods may be 7%, for example. Various dehydration procedures may be used as, for instance, drying in air, vacuum, $CO_2$, or N, at temperatures ranging from 80° F. to 212° F. Drying by immersion into hot fat or oil may be used to effect or aid the dehydration.

*Step #5.*—Explode the food pieces by placing them into a closed chamber or pressure gun, raising the pressure between a range of 30 to 300 pounds per square inch and the temperature to between a range of 200° F. to 600° F. for a period which may range from a few seconds to 20 minutes, and then instantaneously releasing to a lower pressure and temperature. A specific preferred treatment for some foods is, for example, the use of a temperature of 500° F. in a superheated steam atmosphere, at a pressure of 60 pounds per square inch, for a period of 20 seconds. The explosion procedure may be repeated two or more times, if desired.

*Step #6.*—The optional step in Step #2 and/or Step #3 followed by Steps #4 and #5 may be repeated if desired.

*Step #7.*—The exploded materials may be ejected if desired into fat or oil vapors, or into $CO_2$ or N. They may also be coated or impregnated, or they may be briquetted, if desired, with sugar syrup or molten fat which is allowed to congeal thereon and within the structure of the food pieces.

This is a continuation in part of application Serial No. 272,137, filed May 6, 1939.

What I claim is:

1. The process of producing a relatively unexpanded, structure disrupted, substantially dry, quickly water permeable food piece, said process comprising slowly freezing the food piece so as to develop large ice crystals therein and then dehydrating the food piece so as to produce a relatively dry and dehydrated food piece therefrom.

2. The process of producing a relatively unexpanded, structure disrupted, substantially dry, quickly water permeable food piece, said process comprising precooking the food piece, then slowly freezing the food piece so as to develop large ice crystals therein, and then dehydrating the food piece so as to produce a relatively dry food piece therefrom.

3. The method of producing an exploded, expanded, structure disrupted, water permeable, substantially dry food piece, said method comprising slowly freezing the food piece so as to develop large ice crystals therein, then dehydrating the food piece, and then subjecting the food piece to an elevated pressure and subsequently instantly releasing said pressure to a lower pressure.

ALBERT MUSHER.